United States Patent
Ma et al.

(10) Patent No.: US 11,729,528 B2
(45) Date of Patent: Aug. 15, 2023

(54) COLUMN-INTERLEAVED PIXEL ARRAY

(71) Applicant: Gigajot Technology, Inc., Pasadena, CA (US)

(72) Inventors: Jiaju Ma, Monrovia, CA (US); Saleh Masoodian, Monrovia, CA (US)

(73) Assignee: Gigajot Technologies, Inc., Pasadena, CA (US)

( * ) Notice: Subject to any disclaimer, the term of this patent is extended or adjusted under 35 U.S.C. 154(b) by 0 days.

(21) Appl. No.: 17/716,320

(22) Filed: Apr. 8, 2022

(65) Prior Publication Data

US 2022/0377270 A1 Nov. 24, 2022

Related U.S. Application Data

(63) Continuation of application No. 17/006,187, filed on Aug. 28, 2020, now Pat. No. 11,330,220, which is a continuation of application No. 16/776,481, filed on Jan. 29, 2020, now Pat. No. 10,805,569.

(60) Provisional application No. 62/798,197, filed on Jan. 29, 2019.

(51) Int. Cl.
*H04N 25/75* (2023.01)
*H04N 25/11* (2023.01)

(52) U.S. Cl.
CPC .............. *H04N 25/75* (2023.01); *H04N 25/11* (2023.01)

(58) Field of Classification Search
CPC .. H04N 5/378; H04N 9/0455; H04N 5/37457; H04N 9/04557
See application file for complete search history.

(56) References Cited

U.S. PATENT DOCUMENTS

| | | | |
|---|---|---|---|
| 8,130,304 B2 * | 3/2012 | Yin | H04N 5/378 257/292 |
| 8,513,760 B2 | 8/2013 | Park | |
| 8,913,168 B2 | 12/2014 | Matsuda et al. | |
| 9,774,801 B2 | 9/2017 | Hseih et al. | |
| 9,832,405 B2 | 11/2017 | Abe et al. | |
| 10,050,073 B2 * | 8/2018 | Ishiwata | H01L 27/14647 |
| 2009/0046189 A1 | 2/2009 | Yin et al. | |
| 2009/0090845 A1 | 4/2009 | Yin et al. | |
| 2011/0019051 A1 * | 1/2011 | Yin | H04N 9/07 348/311 |
| 2011/0176045 A1 | 7/2011 | Ahn et al. | |
| 2011/0221941 A1 | 9/2011 | Sato | |
| 2011/0273598 A1 | 11/2011 | Ogino et al. | |
| 2012/0175498 A1 * | 7/2012 | Krymski | H01L 27/14609 250/208.1 |

(Continued)

OTHER PUBLICATIONS

European Patent Office, International Search Report and Written Opinion of the International Searching Authority dated Aug. 14, 2020 in International Application No. PCT/US2020/015743, 17 pages.

(Continued)

*Primary Examiner* — Nhan T Tran
(74) *Attorney, Agent, or Firm* — Robert C. Kowert; Kowert, Hood, Munyon, Rankin & Goezel, P.C.

(57) ABSTRACT

Shared-readout pixels conventionally disposed in two or more physical columns of a pixel array are spatially interleaved (merged) within a single physical column to yield a pixel array in which each physical pixel column includes two or more logical columns of shared-readout pixels coupled to respective logical-column output lines.

19 Claims, 4 Drawing Sheets

(56) References Cited

U.S. PATENT DOCUMENTS

| | | |
|---|---|---|
| 2013/0250137 A1 | 9/2013 | Matsuda et al. |
| 2015/0029373 A1 | 1/2015 | Famaguchi et al. |
| 2015/0070544 A1* | 3/2015 | Smith .................... H04N 5/355 |
| | | 348/297 |
| 2016/0165159 A1 | 6/2016 | Hseih et al. |
| 2016/0204160 A1* | 7/2016 | Itonaga ............. H01L 27/14831 |
| | | 257/229 |
| 2017/0201702 A1 | 7/2017 | Niwa et al. |
| 2017/0302872 A1 | 10/2017 | Tanaka et al. |
| 2017/0338262 A1 | 11/2017 | Hirata et al. |
| 2018/0027192 A1 | 1/2018 | Morisaki et al. |
| 2018/0343404 A1* | 11/2018 | Hwang .............. H04N 5/35581 |

OTHER PUBLICATIONS

European Patent Office, Invitation to Pay Additional Fees, Partial International Search Report, and Written Opinion dated Apr. 15, 2020 in International Application No. PCT/US2020/015743, 10 pages.

International Bureau of World Intellectual Property Organization (WIPO), International Preliminary Reporton Patentability dated Aug. 12, 2021 in International Application No. PCT/US2020/015743, 12 pages.

* cited by examiner

Column-Interleaved Pixel Array

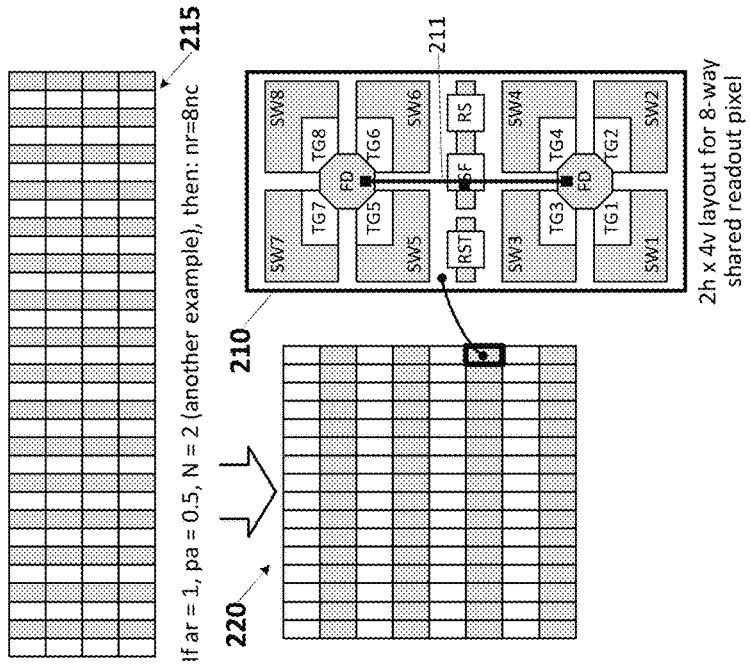
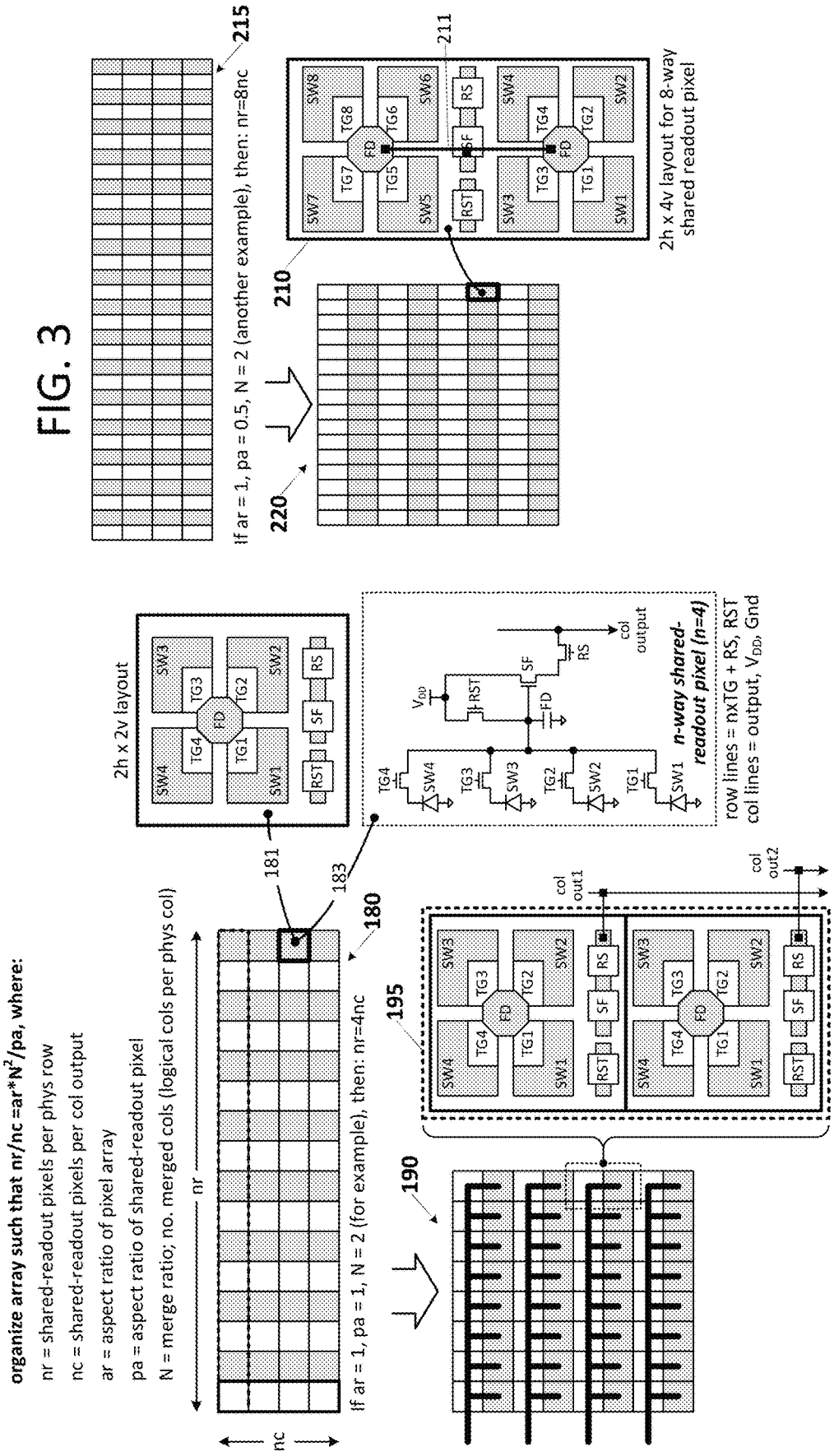

Sub-Pixel Column Interleaving

COLUMN-INTERLEAVED PIXEL ARRAY

CROSS-REFERENCE TO RELATED APPLICATIONS

This application is a continuation of U.S. patent application Ser. No. 17/006,187 filed Aug. 28, 2020 (U.S. Pat. No. 11,330,220), which is a continuation of U.S. patent application Ser. No. 16/776,481 filed Jan. 29, 2020 (U.S. Pat. No. 10,805,569), which claims the benefit of U.S. provisional application No. 62/798,197 filed Jan. 29, 2019. Each of the foregoing applications is hereby incorporated by reference.

TECHNICAL FIELD

The disclosure herein relates to integrated-circuit image sensors.

INTRODUCTION

Complementary metal oxide semiconductor (CMOS) image sensors are widely used in various imaging applications, such as consumer, industrial, and scientific imaging applications. Driven by the pursuit of higher spatial resolution and more compact sensor size, the pitch size of the pixels has been undergoing a rapid shrinking trend. Enabled by the advanced CMOS fabrication technologies, pixels with sub-micron pitch size (0.8 um and 0.7 um) have been used in consumer products.

Predominant constraints for further shrinking the CMOS pixel size include (i) the area required for transistors needed to read out the pixel signal, (ii) the minimum width, area, and spacing for the pixel implantation masks, and (iii) the minimum width and spacing for the metal wires that provide pixel control signals. While shared readout architectures are widely used to overcome the readout-transistor area and implantation-mask constraints (i.e., sharing a capacitive/floating-diffusion node, source-follower transistor and read-select transistor for multiple photodetection elements), those same architectures generally increase the requisite number transfer-gate control lines per pixel row (due to the separate transfer gate (TG) and TG control line needed for each photodetection element), driving up wire count and often forcing designers to compromise pixel performance to meet tight wire-spacing constraint.

DRAWINGS

The various embodiments disclosed herein are illustrated by way of example, and not by way of limitation, in the figures of the accompanying drawings and in which like reference numerals refer to similar elements and in which:

FIG. 2 illustrates considerations bearing on organization of a merged-column pixel array;

FIG. 3 illustrates another merged-column pixel-organization example, in this case assuming an 8-way shared-readout pixel having a non-unity aspect ratio;

DETAILED DESCRIPTION

Figure 1:
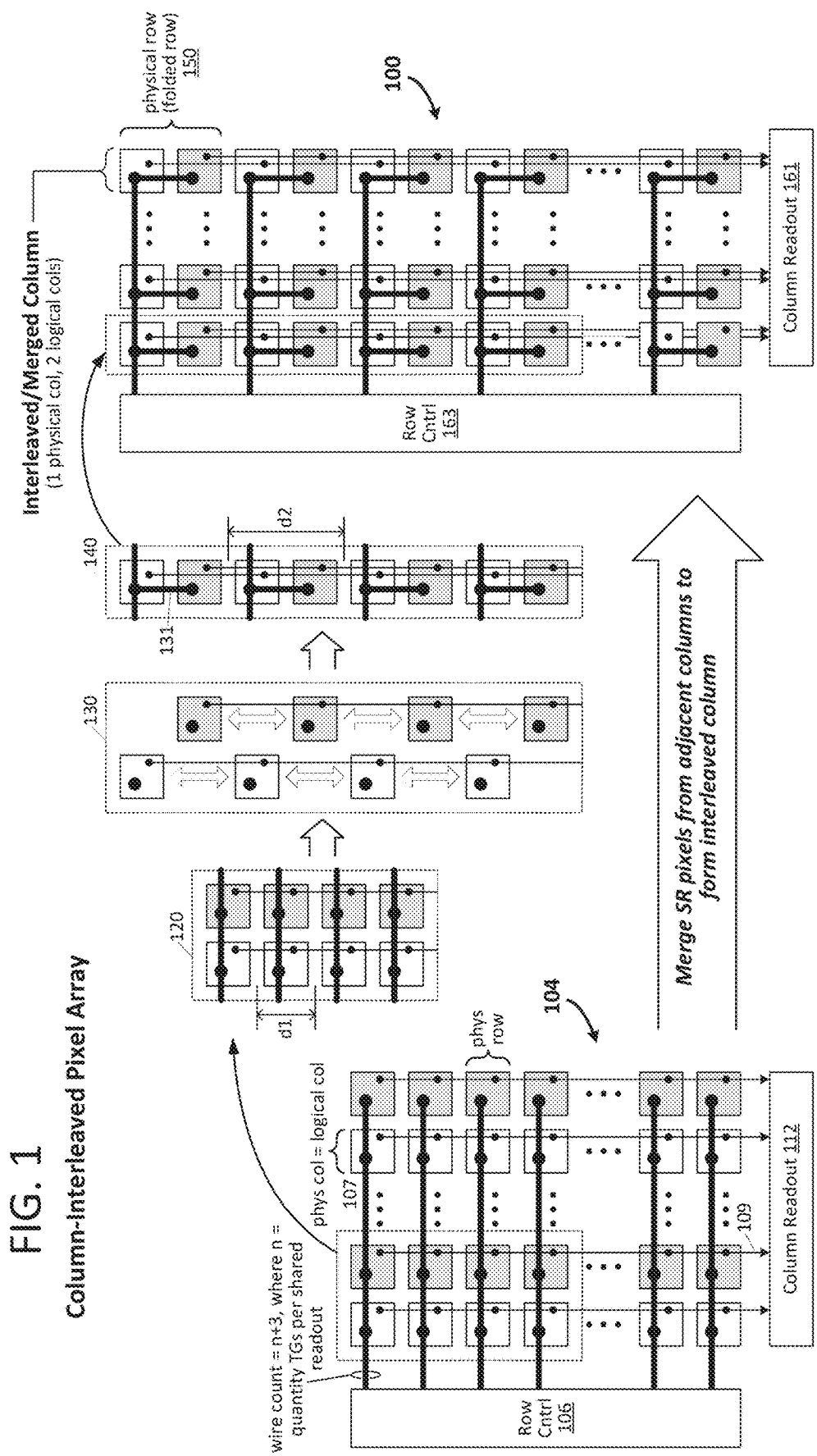
FIG. 1 illustrates an embodiment of image sensor having a column-interleaved pixel array, showing a conceptual progression from a non-interleaved architecture having a one-to-one correspondence between logical pixel columns to an interleaved architecture having multiple logical pixel columns per physical pixel column.

In various embodiments herein, shared-readout pixels conventionally disposed in two or more physical columns of a pixel array are spatially interleaved (merged) within a single physical column to yield a pixel array in which each physical pixel column includes two or more logical columns of shared-readout pixels coupled to respective logical-column output lines. Because two or more neighboring shared-readout pixels within a given merged column drive different column outputs, those shared-readout pixels may be read-out simultaneously and thus controlled by a shared set of row control lines—increasing the spacing available for row-line routing by a factor of 'N', where N is the number of logical pixel columns per physical pixel column (or column output lines coupled to respective sets of shared-readout pixels within a given physical row) and referred to herein as a "merge ratio."

In a number of column-interleaved pixel array embodiments presented herein (and host integrated-circuit image sensors in which those arrays are deployed), multiple shared-readout pixels are disposed in an interleaved structure to increase the horizontal space for the row control signal conductors. In general, the shared-readout pixels have n×m ('n' times 'm') photodetection elements or sub-pixels that may be independently read out (i.e., generation of output signal corresponding to charge accumulated within the sub-pixel photodetection element during an exposure interval) and reset via respective transfer gates, where m is the number of vertical pixels (extending along an axis parallel to the column output lines traversing the pixel array) and n is the number of horizontal pixels (extending along an axis orthogonal to the column output lines). As detailed below, two or more logical columns of shared-readout pixels (i.e., each logical column coupled to a respective column output line) may be integrally or fractionally interleaved within a physical column of the pixel array to yield expanded (row-to-row) control wire spacing. In an integrally interleaved pixel array, all photodetection elements (or sub-pixels) of a shared-readout pixel are collocated within a discrete area (i.e., no overlap with area/footprint of any other shared-readout pixel) so that two or more logical columns of shared-readout pixels are interleaved within a single physical column with granularity of whole shared-readout pixels. In a fractionally interleaved pixel array, by contrast, two or more logical columns of shared-readout pixels are interleaved with sub-pixel granularity (or granularity of sub-pixel groups or clusters) such that the footprint of each shared-readout pixel corresponding to a given logical column overlaps the footprint of at least one shared-readout pixel of another logical column. For example, two halves of the sub-pixels within a shared-readout pixel may be sufficiently offset from one another (in terms of physical layout) to allow placement (interleaving) of half of the sub-pixels within another shared-readout pixel (corresponding to a different logical pixel column) within the offset. These and other features and embodiments are described in further detail below.

FIG. 1 illustrates an embodiment of image sensor 100 having a column-interleaved pixel array, showing a conceptual progression from a non-interleaved architecture 104 having a one-to-one correspondence between logical pixel columns (i.e., each driving a respective column output line)

and physical pixel columns to the interleaved architecture (100) having multiple logical pixel columns per physical pixel column. Referring first to non-interleaved architecture 104, a row control circuit 106 drives row control signals to each physical row of shared-readout pixels via respective sets of row control wires 107 to effect parallel readout (i.e., from all shared-readout pixels of a given row) via column-shared output lines 109 (i.e., column output lines extending to column readout circuitry 112), generally sequencing from row to row to effect a rolling shutter (i.e., each physical row readout in a respective "readout" time interval with the total number of readout intervals transpiring within an exposure interval). The row control wire count per physical row of shared-readout pixels is generally given by n+3, where 'n' is the number of photodetection elements per shared-readout pixel that are independently read-able via activation of respective transfer gates (i.e., n=number of transfer-gate (TG) control signals). The '+3' term accounts for a reset line and row-select line (to switch on a reset transistor and row-select transistor, respectively, that constitute, along with a source-follower and capacitive/floating-diffusion node, a shared-readout circuit for driving a signal corresponding to photocharge transferred to the floating diffusion node from a given photodetection element or collection of photodetection elements) and boundary spacing needed between row control wires of neighboring rows. Thus, the area required for routing the row control wires increases linearly with 'n' and, as each wire (metal or other conductive trace) is generally constrained by fabrication rules (typically foundry specific) to have a minimum width 'w' and spacing 's', the maximum number of wires per physical pixel array can be deterministically calculated with that maximum number constraining the shared-readout pixel pitch (i.e., distance d1 as shown in excerpt 120).

Following the conceptual progression shown at 130 the individual shared-readout pixels in adjacent pixel columns (i.e., driving respective column output lines) are offset by the shared-readout pixel pitch to make room for physically merging the pixels of the two original pixel columns excerpted in view 120 into a unified physical column (a 2:1 merge ratio in this example) as shown at 140. The row control lines coupled in common to each pair of pixels originally disposed in the same row (i.e., row control lines 107) remain electrically coupled as in architecture 104— e.g., via the stub connection shown at 131—so that each such pair of pixels remains in the same physical row (i.e., all coupled in common to the same set of row control lines) with that physical row effectively folded in two (according to the merge ratio, N) as shown at 150 within the finalized interleaved-column image sensor 100. Through this architectural change, the space available for row control line routing is expanded by a factor of N (the merge ratio) and, thus from d1 to d2 (2*d1, where '*' denotes multiplication) in the two-column merge example shown. Note that, except for physical layout, the column readout circuitry 161 within column-interleaved architecture 100 may remain unchanged relative to the non-merged implementation at 112—ditto for the row control circuitry 163 (unchanged relative to non-merged implementation at 106) except for possible change in total number of physical rows.

FIG. 2 illustrates considerations bearing on organization of a merged-column pixel array. More specifically, given a merge ratio 'N' and assuming a given aspect ratio 'pa' for individual shared-readout pixels (i.e., pa=SR pixel width/height, where width is the shared-readout pixel dimension along an axis perpendicular to the column readout lines and height is the dimension along the column-readout axis) and that the image array as a whole has a desired aspect ratio 'ar', then the ratio of shared-readout pixels per physical row 'nr' (coupled in common to same row control lines) to the number of shared-readout pixels per logical column 'nc' (i.e., coupled in common to same column output line) may be calculated by nr/nc=ar*$N^2$/pa ('*' denoting multiplication, '/' denoting division, superscript denoting exponential). In the FIG. 2 example, for instance individual shared-readout (SR) pixels within array 180 have four sub-pixels (four photodetection elements or photodiode "storage wells" SW1-SW4 for photocharge accumulation ($e^-$) together with four transfer gates TG1-TG4) clustered about a shared floating diffusion node (FD) with reset, source-follower and row-select transistors (RST, SF, RS) disposed adjacent the photodetection element—as shown in detail view 181—to yield a 1:1 shared-pixel aspect ratio (pa=1). A schematic implementation of the shared-readout pixel (referred to as a 2-horizontal by 2-vertical (2h×2v) "4-way shared-readout pixel in view of the four independently read-able sub-pixels arranged 2×2 along orthogonal axes) is shown at 183. Assuming, for purposes of example, a desired aspect ratio of 1:1 for the pixel array as a whole (ar=1) and merge ratio of 2:1 (N=2), then the number of shared-readout pixels per physical row will be four-times (4×) the number of shared-readout pixels per column output line. That is, nr=4nc as shown in conceptual array 180 so that, upon column merge, the structure shown at 190 is produced, with pixels in a given physical column alternately coupled to different column output lines (col out1, col out2 as shown in detail view 195).

FIG. 3 illustrates another merged-column pixel-organization example, in this case assuming an 8-way shared-readout pixel in a two-horizontal (2h) by four-vertical (4v) layout shown at 210 (with clusters of four sub-pixels disposed about respective floating diffusion regions (FD) that are intercoupled to one another (and thus electrically unified into a single capacitive node) and the gate of the source-follower transistor (SF) via metal layer connection 211) having a pixel aspect ratio of 1:2 (pa=0.5). Assuming the same merge ratio (N=2) and unity array aspect ratio (ar=1) as the FIG. 2 example, then nr=8nc as shown within conceptual array 215 to yield, upon column interleaving/merging, the unity aspect ratio column-interleaved array shown at 220.

Figure 4:
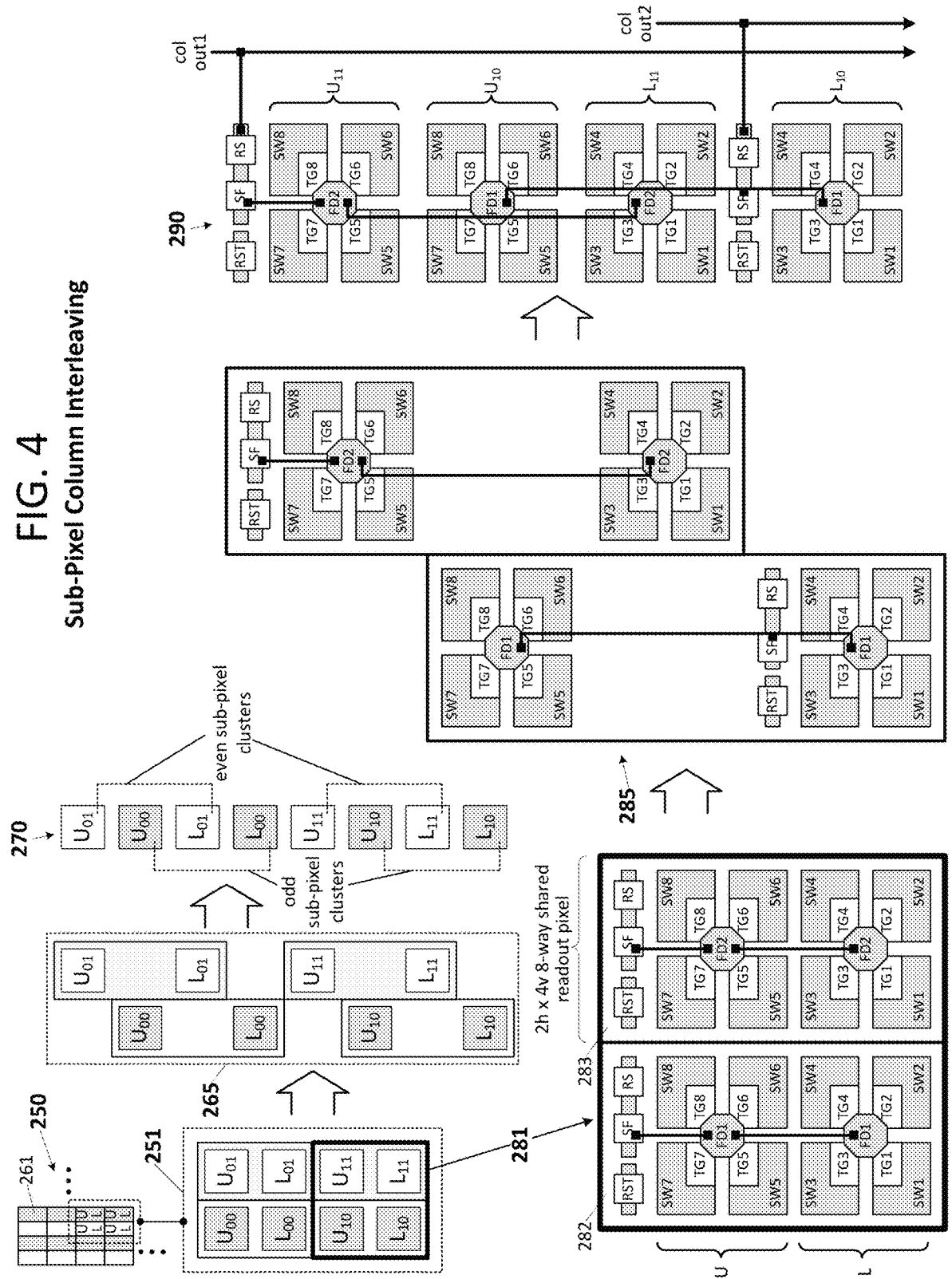
FIG. 4 illustrates an embodiment of a fractional (or sub-pixel) column-interleaved array architecture.

FIG. 4 illustrates an embodiment of a fractional (or sub-pixel) column-interleaved array architecture, showing a progression from a non-interleaved architecture having 8-way shared readout pixels excerpted conceptually at 250—and more specifically from the detail view 251 of four neighboring SR pixels within the non-interleaved architecture 250—to a selected physical column of sub-pixel interleaved logical columns at 270. Referring to the four-SR-pixel detail view at 251, each of the SR pixels (shown at 261 in conceptual array 250) is organized in a 0.5 aspect (2h×4v) such that respective clusters of four sub-pixels are disposed in upper (U) and lower (L) halves of the SR pixel footprint (area). The upper and lower sub-pixel clusters (groups of sub-pixels) in detail view 251 are subscripted to distinguish the non-interleaved physical row and column locations of their respective host SR pixels. As shown conceptually at 265, by (i) offsetting upper and lower clusters within each shared-readout pixel by a distance sufficient for insertion of an upper (or lower) sub-pixel cluster from another shared-readout pixel and (ii) offsetting shared-readout pixels coupled to the same column-output line by a distance sufficient for insertion of the counterpart lower (or upper) sub-pixel cluster from the other shared-readout pixel, the two shared-readout pixels may be column-interleaved at sub-pixel granularity (fractional column interleaving) —in this example, alternating halves of shared-readout pixels are column-interleaved as shown at 270, with all even numbered sub-pixel clusters (counting ordinally from top to bottom along the merged physical pixel column) read-able via a first column output line and all odd-numbered sub-pixel clusters read-able via a second column output line (with a readout circuit dedicated to/shared by each respective pair of even-numbered sub-pixel clusters and a separate readout circuit dedicated to/shared by each respective pair of odd-numbered sub-pixel clusters).

Sub-pixel-cluster-interleaved (fractional column-interleaved) layouts corresponding to the bottom pair of SR pixels within the conceptual views at 251, 265 and 270 are shown at 281, 285 and 290, respectively. That is, layouts of 8-way shared-pixels (282 and 283) are expanded and offset from one another as shown in the conceptual view at 285, and then merged (combined in a direction perpendicular to the column-readout-line axis) to yield the sub-pixel-cluster interleaved result shown at 290. Note that the placements of respective sets of shared-readout/shared-reset transistors (SF, RS, RST) corresponding to the two cluster-interleaved pixels (one set driving col out1, the other driving col out2) may be disposed in any practicable location within the footprint of the two cluster-interleaved shared-readout pixels and thus at locations other than those shown (e.g., SF, RS and RST transistors corresponding to col out2 could be located between sub-pixel clusters $U_{10}$ and $L_{11}$ instead of between $L_{11}$ and $L_{10}$).

Figure 5:
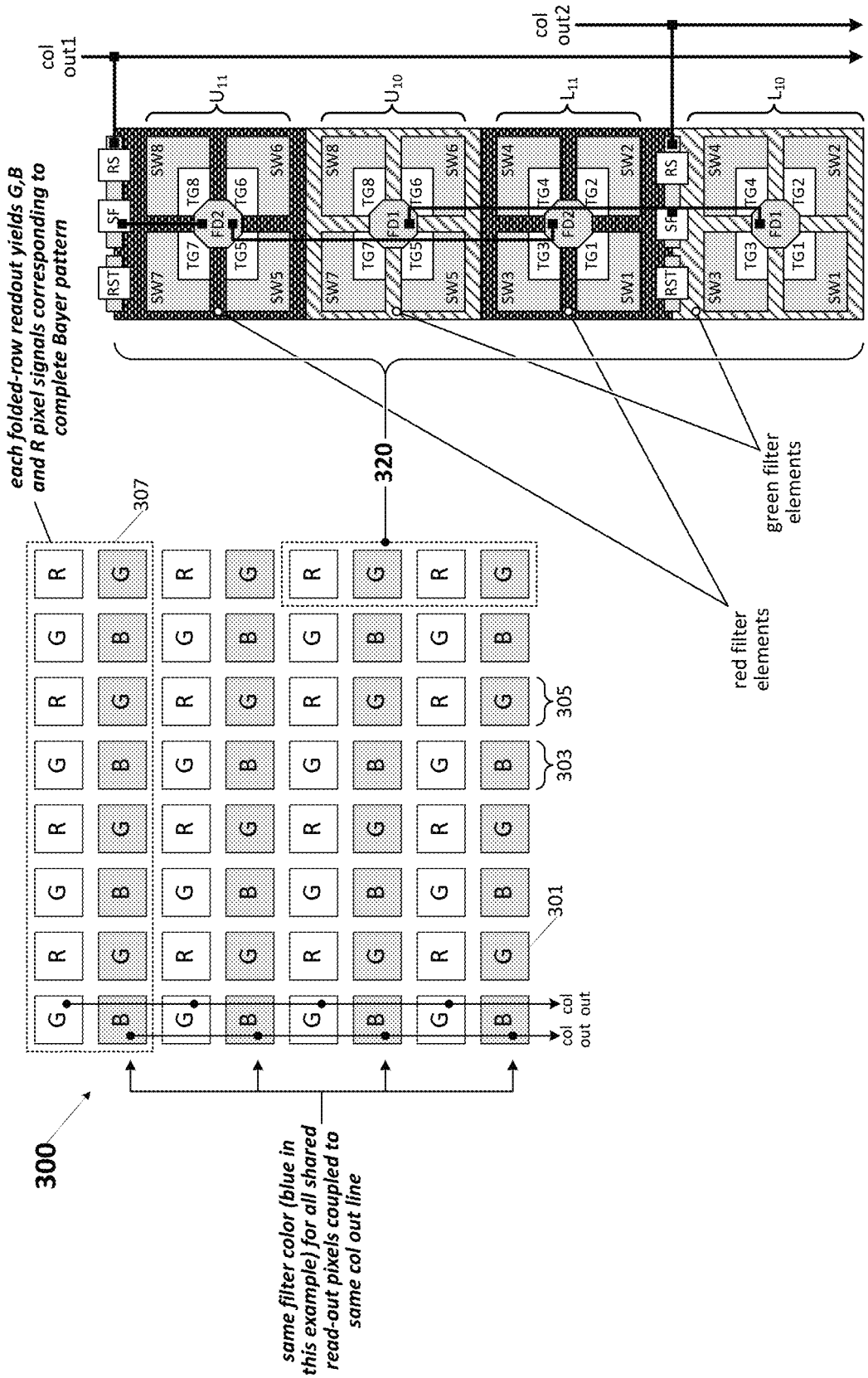
FIG. 5 illustrates an exemplary color filter array (CFA) that may be deployed over the illumination surface (integrated-circuit backside or frontside) of a column-interleaved pixel array according to the various embodiments presented herein.

FIG. 5 illustrates an exemplary color filter array (CFA) 300 that may be deployed over the illumination surface (integrated-circuit backside or frontside) of a column-interleaved pixel array according to the various embodiments herein, and more particularly with respect to the sub-pixel-cluster interleaved pixel array of FIG. 4. In the depicted embodiment, color filter elements 301 within the CFA are arranged in a Bayer pattern with each individual element overlaying (and thus filtering light for) a respective 4-sub-pixel cluster. Because the color filter elements within a physical column of a Bayer-patterned CFA alternate between two colors (green and blue as shown for col 303, or green and red as shown for col. 305), provision of a filter-element 301 per 4-sub-pixel cluster subjects all pixels in a given logical column (i.e., coupled to the same output line) to the same color filtering—that is, all are green filtered, all are blue filtered or all are red filtered. Thus, each column output line of the pixel array conveys signals corresponding exclusively to one color (green, red or blue), and the signals simultaneously read-out over the column output lines of the array (i.e., from a folded physical row as shown in outline 307) include the green-, red-, and blue-filtered signals corresponding to a complete Bayer pattern (two green signals, one red signal and one blue signal corresponding to photodetection elements or clusters thereof in a Bayer orientation). This effect is shown in layout view 320 with respect to two 4-sub-pixel interleaved SR pixels, driving "red" pixel readout signals via col out1 and "green" pixel readout signals col out2, respectively—the two SR pixels being sub-pixel interleaved as shown at 290 of FIG. 4. Color filter arrays having color filter elements that pass light in wavelength-ranges other than those for green, red and blue may be disposed over the illumination surface of merged-column pixel arrays (integrated-circuit backside or frontside as described above) in other embodiments. For example, in backside illumination, color filter arrays may be implemented with filter elements for white (deemed to be a "color" for purposes herein), yellow, magenta, cyan, emerald, or infrared light (or any other practicable range of electromagnetic radiation) instead of or in addition to red, blue and/or green color filter elements at the backside of the semiconductor substrate of the CFA 300 overlaying respective clusters as described above, such that the clusters of the CFA 300 may be exposed to light at the backside through the color filter arrays. In this example, the connection (e.g., similar to the metal layer connection 211 of FIG. 3) between the floating diffusion regions (FD) of the clusters disposed underneath filter elements of the same color may be implemented within one or more metal layers and disposed adjacent the frontside surface of the semiconductor substrate of the CFA 300. Individual color elements may pass wavelengths in selected ranges (e.g., range of electromagnetic frequencies corresponding to "green" light) or block wavelengths in selected ranges to filter the light incident on a given photodetection element.

The various embodiments of column-interleaved pixel arrays, column readout logic, readout controllers, color filter arrays and so forth disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply details not required to practice those embodiments. For example, any of the specific shared-readout pixel counts, merge ratios, sub-pixel cluster sizes (i.e., number of sub-pixels per cluster), pixel aspect ratios, sub-pixel counts, pixel layouts, trace-routing arrangements, color filter array patterns and/or dispositions with respect to individual sub-pixels or clusters of sub-pixels, transistor types (e.g., NMOS or PMOS), component elements and the like can be different from those described above in alternative embodiments. Signal paths depicted or described as individual signal lines may instead be implemented by multi-conductor signal buses and vice-versa and may include multiple conductors per conveyed signal (e.g., differential or pseudo-differential signaling). The term "coupled" is used herein to express a direct connection as well as a connection through one or more intervening functional components or structures. Programming of any configurable parameters may be achieved, for example and without limitation, by loading a control value into a register or other storage circuit within an integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An integrated-circuit image sensor, comprising:
   a color filter array having color filter elements disposed in a predetermined color pattern;
   photodiode clusters disposed respectively beneath the color filter elements, each of the photodiode clusters having a floating diffusion node and a plurality of photodiodes coupled to the floating diffusion node; and
   conductive interconnects each coupled between the floating diffusion nodes of a respective pair of the photodiode clusters, the respective pair of the photodiode clusters being disposed beneath a same-color pair of the color filter elements such that the floating diffusion node of each photodiode cluster disposed beneath a color filter element of a given color is conductively connected to the floating diffusion node of another photodiode cluster disposed beneath a color filter element of that same given color, and constituent photodiode clusters of the respective pair of the photodiode clusters disposed beneath the same-color pair of the color filter elements being separated from one another by at least one other of the photodiode clusters.

2. The integrated-circuit image sensor of claim 1 wherein each of the photodiode clusters additionally includes a plurality of transfer gates coupled respectively between the plurality of photodiodes and the floating diffusion node to effect respective switchable conductive paths between the plurality of photodiodes and the floating diffusion node.

3. The integrated-circuit image sensor of claim 2 further comprising row control circuitry to selectively assert transfer-gate-enable signals via respective transfer gate control lines, and wherein each transfer gate within the plurality of transfer gates is coupled to a respective one of the transfer gate control lines to enable any one or more of the plurality of transfer gates to be switched to a conducting state during a given time interval.

4. The integrated-circuit image sensor of claim 1 further comprising a plurality of reset transistors, each reset transistor to the conductively connected floating diffusion nodes of the respective pair of the photodiode clusters such that the integrated-circuit image sensor comprises fewer of the reset transistors than of the photodiode clusters.

5. The integrated-circuit image sensor of claim 1 wherein the photodiode clusters are organized in rows and columns to form a pixel array and wherein the constituent photodiode clusters of the respective pair of the photodiode clusters disposed beneath the same-color pair of the color filter elements are disposed in a same one of the columns.

6. The integrated-circuit image sensor of claim 5 wherein the conductive interconnect coupled between the floating diffusion nodes of the respective pair of the photodiode clusters extends over the at least one other of the photodiode clusters disposed in the same one of the columns.

7. The integrated-circuit image sensor of claim 1 wherein the photodiode clusters are implemented in a semiconductor substrate of the integrated-circuit image sensor, and wherein the conductive interconnects each comprise one or more conductive elements implemented within one or more metal layers of the integrated-circuit image sensor.

8. The integrated-circuit image sensor of claim 7 wherein the one or more metal layers are disposed adjacent a front-side surface of the semiconductor substrate, the color filter array is disposed over a back-side surface of the semiconductor substrate, and the plurality of photodiodes within each of the photodiode clusters are exposed to light at the back-side surface of the semiconductor substrate to effect a back-side illuminated integrated-circuit image sensor.

9. The integrated-circuit image sensor of claim 1 wherein the predetermined color pattern comprises a Bayer color filter pattern.

10. The integrated-circuit image sensor of claim 1 wherein, within each of the photodiode clusters, the floating diffusion node is disposed in a region centered between the plurality of photodiodes.

11. The integrated-circuit image sensor of claim 1 wherein the color filter elements are arranged in rows and columns within the color filter array, the photodiode clusters are organized in rows and columns to form a pixel array disposed beneath the color filter array, and the color filter elements in every other column of the filter array comprise color filter elements of a first color and color filter elements of a second color disposed in an alternating pattern.

12. The integrated-circuit image sensor of claim 10 wherein the color filter elements are arranged in rows and columns within the color filter array, the photodiode clusters are organized in rows and columns to form a pixel array disposed beneath the color filter array, and each contiguous set of four color filter elements within every other column of the filter array comprise two color filter elements of a first color interleaved with two color filter elements of a second color such that each of the color filter elements of the first color is separated from the other of the color filter elements of the first color by one of the color filter elements of the second color and vice-versa.

13. The integrated-circuit image sensor of claim 12 wherein the two color filter elements of the first color comprise a first same-color pair of the color filter elements beneath which is disposed a first one of the pairs of the photodiode clusters having conductively-connected floating diffusion nodes, and the two color filter elements of the second color comprise a second same-color pair of the color filter elements beneath which is disposed a second one of the pairs of the photodiode clusters having conductively-connected floating diffusion nodes.

14. The integrated-circuit image sensor of claim 13 further comprising a first output circuit coupled between the conductively-connected floating diffusion nodes of the first one of the pairs of the photodiode clusters and a first column output line, and a second output circuit coupled between the conductively-connected floating diffusion nodes of the second one of the pairs of the photodiode clusters and a second column output line.

15. The integrated-circuit image sensor of claim 14 wherein the first output circuit comprises an amplifier transistor having a gate terminal coupled to the conductively-connected floating diffusion nodes of the first one of the pairs of the photodiode clusters, a source terminal switchably coupled to the first column output line and a drain terminal coupled to a supply voltage node.

16. An integrated-circuit image sensor, comprising:
color filter elements organized in an array and including red, green and blue component filter elements disposed in a Bayer pattern;
photodiode clusters disposed respectively beneath the color filter elements, each of the photodiode clusters having four or more photodiodes and a floating diffusion node centered between and coupled to the four or more photodiodes; and
electrical conductors each connected between the floating diffusion nodes of a respective pair of the photodiode clusters, the respective pair of the photodiode clusters being disposed beneath a same-color pair of the color filter elements such that the floating diffusion node of each photodiode cluster disposed beneath a red, green or blue component filter element is conductively connected to the floating diffusion node of another photodiode cluster disposed beneath a same-color component filter element, and constituent photodiode clusters of the respective pair of the photodiode clusters disposed beneath the same-color pair of the color filter elements being separated from one another by at least one other of the photodiode clusters.

17. The integrated-circuit image sensor of claim 16 wherein the photodiode clusters are organized in rows and columns and wherein each of the conductors connected between floating diffusion nodes of the respective pair of the photodiode clusters extends over the at least one other of the photodiode clusters and parallel to the columns, the integrated-circuit image sensor further comprising a first output circuit coupled between the conductively-connected floating diffusion nodes of a first one of the pairs of the photodiode clusters and a first column output line that extends parallel to the columns, and a second output circuit coupled between the conductively-connected floating diffusion nodes of a second one of the pairs of the photodiode clusters and a second column output line that extends parallel to the columns.

18. The integrated-circuit image sensor of claim 16 wherein:
the photodiode clusters are implemented in a semiconductor substrate of the integrated-circuit image sensor;
the electrical conductors are implemented at least in part within one or more metal layers disposed adjacent a first surface of the semiconductor substrate;
the color filter array is disposed over a back-side surface of the semiconductor substrate; and
the four or more photodiodes within each of the photodiode clusters are exposed to light at the back-side surface of the semiconductor substrate.

19. An integrated-circuit image sensor, comprising:
a color filter array having color filter elements disposed in a predetermined color pattern;
photodiode clusters disposed respectively beneath the color filter elements, each of the photodiode clusters having a floating diffusion node and a plurality of photodiodes coupled the floating diffusion node; and
means for conductively connecting the floating diffusion nodes of respective pairs of the photodiode clusters, each of the respective pairs of the photodiode clusters being disposed beneath a same-color pair of the color filter elements such that the floating diffusion node of each photodiode cluster disposed beneath a color filter element of a given color is conductively connected to the floating diffusion node of another photodiode cluster disposed beneath a color filter element of that same given color, and constituent photodiode clusters of the respective pair of the photodiode clusters disposed beneath the same-color pair of the color filter elements being separated from one another by at least one other of the photodiode clusters.

* * * * *